United States Patent
Bovo et al.

(10) Patent No.: US 10,020,768 B2
(45) Date of Patent: Jul. 10, 2018

(54) DRIVING APPARATUS FOR AN ELECTRIC MOTOR, A METHOD FOR ACTUATION THEREOF AND A MOTOR UNIT WHICH COMPRISES THE DRIVING APPARATUS

(71) Applicant: CAREL INDUSTRIES S.P.A., Brugine (PD) (IT)

(72) Inventors: Livio Bovo, Brugine (IT); Umberto Bianchini, Brugine (IT)

(73) Assignee: CAREL INDUSTRIES S.P.A., Brugine (PD) (IT)

( * ) Notice: Subject to any disclaimer, the term of this patent is extended or adjusted under 35 U.S.C. 154(b) by 413 days.

(21) Appl. No.: 14/951,075

(22) Filed: Nov. 24, 2015

(65) Prior Publication Data
US 2016/0156289 A1    Jun. 2, 2016

(30) Foreign Application Priority Data
Nov. 27, 2014    (IT) ................ VI2014A0303

(51) Int. Cl.
*H02P 27/00* (2006.01)
*H02P 27/04* (2016.01)
(Continued)

(52) U.S. Cl.
CPC .......... *H02P 27/04* (2013.01); *H02M 3/1584* (2013.01); *H02P 6/002* (2013.01); *H02M 1/10* (2013.01);
(Continued)

(58) Field of Classification Search
CPC .... H02M 1/4225; H02M 1/4258; H02M 3/00; Y02B 20/386; Y02B 70/126
See application file for complete search history.

(56) References Cited

U.S. PATENT DOCUMENTS 6,211,657 B1   4/2001 Goluszek
7,227,277 B2 *  6/2007 Chapman ............... H02J 1/10
                                                                 307/43
(Continued)

OTHER PUBLICATIONS

Italian Patent Office Search Report and Written Opinion dated Jul. 30, 2015 (partially in English).
(Continued)

*Primary Examiner* — Shawki S Ismail
*Assistant Examiner* — Zoheb Imtiaz
(74) *Attorney, Agent, or Firm* — Hedman & Costigan, P.C.; James V. Costigan; Kathleen A. Costigan

(57) ABSTRACT

A driving apparatus for an electric motor (11) comprising:
an inverter (12) connectable to an electric motor (11) for supplying electrical current thereto;
accumulator means (13) for providing a continuous electrical current, connected to the inverter (12) to provide electrical supply thereto;
a transformer device (14) comprising first connection means (15) suitable to be coupled to a power grid to absorb power, and second connection means (16), suitable for coupling to the accumulator means (13).
The transformer device (14) comprises:
two buck converters (100, 200) connected in parallel to form an interleaved configuration;
a boost converter (300) connected in series with respect to the buck converters;
a control device connected to the converters (100) and configured to operate the converters so as to obtain a preset constant voltage at the ends of said second connection means.

9 Claims, 2 Drawing Sheets

(51) Int. Cl.
*H02M 3/158* (2006.01)
*H02P 6/00* (2016.01)
*H02M 1/10* (2006.01)
*H02M 1/36* (2007.01)

(52) U.S. Cl.
CPC ............ *H02M 1/36* (2013.01); *H02M 3/1582* (2013.01); *H02M 2003/1586* (2013.01)

(56) References Cited

U.S. PATENT DOCUMENTS

2010/0097031 A1* 4/2010 King .................. B60L 11/1803
320/109
2011/0050174 A1* 3/2011 King .................. B60L 11/1811
320/134
2013/0271077 A1* 10/2013 Kim .................. B60L 11/1811
320/109

OTHER PUBLICATIONS

Hwu et al., Two-Stage-Cascaded Li-Battery Charger with Current Ripple Considered, Industrial Electronics and Applications (ICIEA), 2010 the 5th IEEE Conference on, Jun. 2010, pp. 2165-2168, IEEE.

\* cited by examiner

DRIVING APPARATUS FOR AN ELECTRIC MOTOR, A METHOD FOR ACTUATION THEREOF AND A MOTOR UNIT WHICH COMPRISES THE DRIVING APPARATUS

The present invention relates to a driving apparatus for an electric motor, a method for actuation thereof and a motor unit which comprises the driving apparatus. In particular, the present invention relates to powering an asynchronous or brushless electric motor specially dedicated to driving a compressor for a refrigerating machine.

More in general, the present invention relates to an asynchronous electric or brushless motor having variable velocity and torque, destined for use in the field commonly known as HVACR i.e. heating, ventilation, conditioning and refrigeration of air, water and fluids for heat transport.

Today, in this field, electric motors are used that are provided with driving apparatus for modulating the rotation velocity and torque thereof, known in the jargon as drivers.

These driving apparatus have a connecting portion to the grid, a transformation portion and an inverter connectable to the windings of the motor.

The transformation portion is provided with a capacitor to which the inverter is connected so as to be powered. These traditional motors are differentiated by various functional parameters.

Among these functional parameters there is the type of grid supply, i.e. if the electric supply is available in single phase, two-phase or three-phase.

A further functional parameter on which the structure of these known motors depends is the available voltage of the grid supply, which is generally about 110V, 120V, 200V or 230V for single-phase supply, 240V for two-phase supply and generally 380V, 400V or 460V for three-phase supply.

The traditional driving apparatus are configured as a function of the type of supply and the supply voltage.

The dimensions of the isolations of the windings of traditional motors also depend on these.

A further functional parameter of differentiation of traditional motors is the requested power, or output power, i.e. the power which the electric motor must be able to dispense.

Further, these motors and the respective driving apparatus must have a functioning that respects limit standards in relation to the harmonic distortion of absorbed current from the grid or input on the grid cable.

A drawback of these traditional motors is that they are dedicated for each use condition defined by the corresponding functioning parameters.

In other words, on varying the type of supply and the use grid voltage, various motors are used, each dedicated to being used in the specific conditions defined by the type of supply and voltage and the grid frequency available at the installation seating.

A high-tension converter for drivers of traditional type is described in EP504094.

This solution is applicable only in the single-phase field and correspondingly has the drawback of being suitable for operation in a limited voltage field.

Further, this device includes a BUCK-BOOST control which acts by self-adapting to each half-wave.

A further driver for electric motors is known from US2011/132899 which however includes a configuration limited to use in the single-phase field and with only the BOOST mode.

In particular, the traditional power apparatus described in US2011/132899 has a structure with boost converters in interleaved mode, which is incompatible with the possibility of a three-phase supply.

The drawback underpinning the present invention is to make an electric asynchronous or brushless motor, with variable velocity or torque, independent of the type of grid voltage available for powering it, while respecting the standards relating to harmonic distortion of the current absorbed from the grid.

The main objective of the present invention is to realise a driving apparatus for an electric motor, a method for activating a driving apparatus and a motor group which comprises the apparatus, which offers a solution to the drawback by obviating the above-described drawbacks of the above-described electric motors.

In the scope of this objective, an aim of the present invention is to provide a driver unit that has a motor the structure of which is independent of the type and supply voltage, as well as being independent of the grid frequency available to the grid to which it is destined to be connected for electrical supply.

A further aim of the present invention consists in realising a driving apparatus and a method for actuating it that are able to power an electric motor independently of the type of supply and the supply voltage, as well as being independent of the grid frequency available to the supply grid.

A still further aim of the present invention consists in providing a motor unit the motor of which can be dimensioned independently of the type, supply voltage and grid frequency available.

A further aim of the invention is to realise a driving apparatus which enables simplifying the production of asynchronous and brushless motors for compressors.

A further aim of the invention is to realise a driving apparatus which enables simplifying the management of components for manufacturing of driving units for compressors to be used in the HVACR field.

A still further aim of the invention is to simplify the structure of a driving apparatus for an electric motor and of the electric motor which comprises it.

This task, as well as these and other aims which will more fully emerge in the following, is attained by a driving apparatus for an electric motor, a method for actuation thereof and a motor unit which comprises the driving apparatus according to the here-attached independent claims which are integrated herein for reference.

Detailed characteristics of the driving apparatus for an electric motor and the electric motor comprising the driving apparatus according to the invention are included in the dependent claims, which are integrated herein in their entirety.

In practice, a driving apparatus according to the invention enables powering the windings of an electric motor independently of the type of supply and the grid voltage supply.

The driving apparatus of the present invention is able to power the windings of the electric motor independently of the electricity grid voltage to which it is connected and also independently of the type of supply, whether single phase, two-phase or three-phase. In practice, therefore, a motor unit according to the invention is universal, i.e. it has a unitary structure defined as a function of the power to be dispensed and independent of the electric supply conditions available in the installation location.

What is more, a driving apparatus according to the invention and the motor unit that comprises it are structurally simpler than the traditional driving apparatus, enabling elimination, with respect to these, of electronic circuits and components expressly dedicated to the pre-charge such as the relay and the pre-charging resistance of the condenser which are traditionally mounted in the traditional inverter driving apparatus.

Further characteristics and advantages of the invention will emerge more fully from the description of a preferred but not exclusive embodiment of a driving apparatus for an electric motor, a method for activating it and a motor unit which comprises the driving apparatus according to the invention, illustrated by way of non-limiting example in the appended table of drawings, in which.

Figure 1:
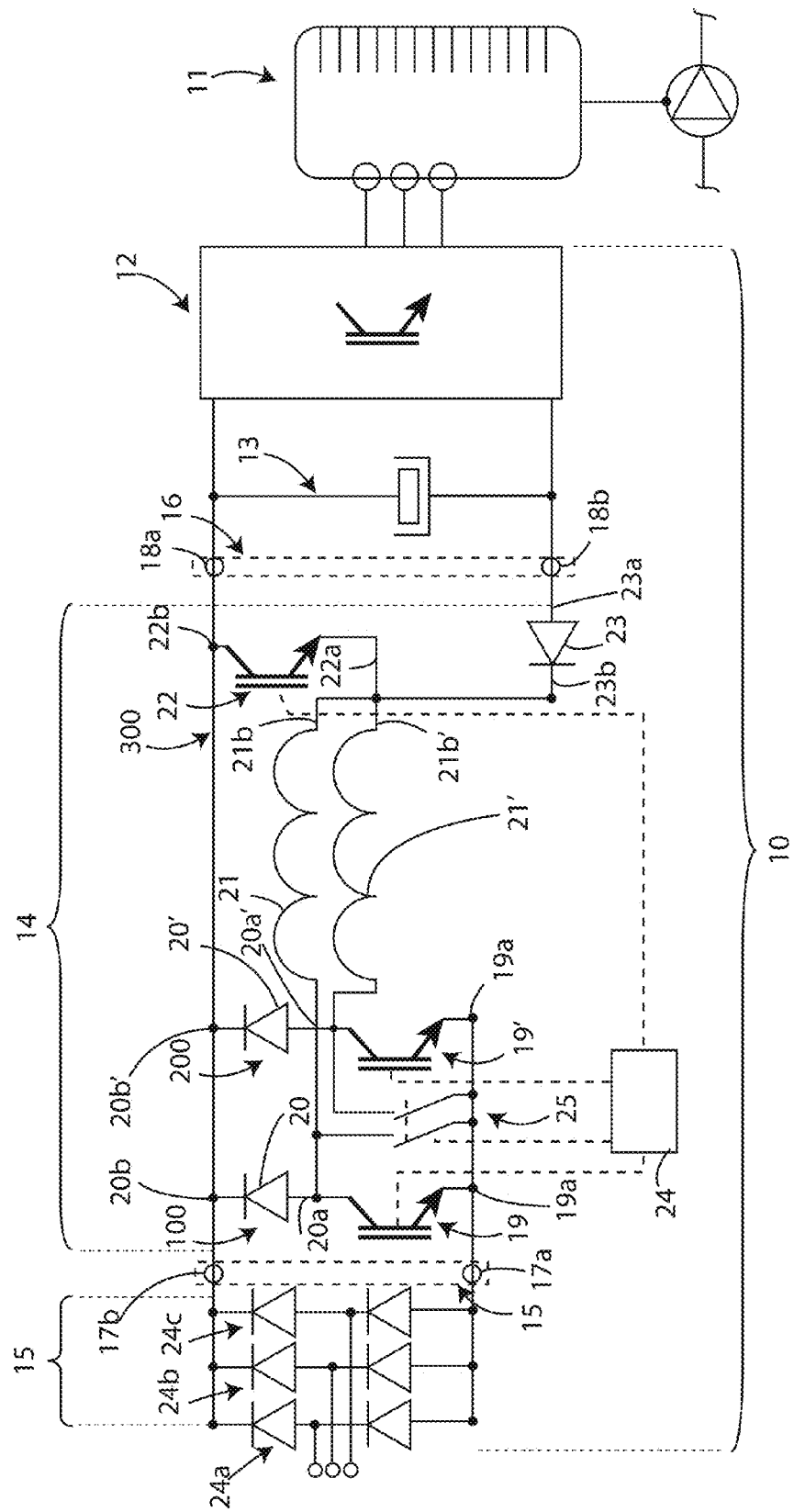
FIG. 1 is a simplified diagram of a motor unit according to the invention.

With particular reference to the figures, 10 denotes in its entirety a driving apparatus for an electric motor 11 comprising:

an inverter 12 connectable to the windings of the electric motor 11 for supplying electrical current to the windings;

accumulator means 13 for providing a continuous electrical current at a predefined voltage, preferably 400V, connected to the inverter 12 to provide electrical supply thereto.

The accumulator means 13 comprise a capacitor connected in parallel to the inverter 12 so as to power the inverter.

The transformer device 14 comprises first connection means 15 suitable or coupling to the power grid to absorb power, and second connection means 16, suitable to be coupled to said accumulator means 13.

According to the invention, the driving apparatus 10 has a peculiarity due the fact that the transformer device 14 is configured so as to absorb power from the grid at any traditional grid voltage, for example in single phase at 110V or 120V or 200V or 240V, or in two-phase at 240V or in three-phase at 380V, or 400V or 460V, and so as to provide power to the accumulator means 13 at a predefined voltage, preferably at 400V, and independent of the grid voltage and of the type of power supply provided thereby, whether single-phase, two-phase or three-phase.

With the use of a driving apparatus 10 according to the invention, a producer of driving units according to the invention will thus be able to provide a range of motor groups which are differentiated from one another only in the power each thereof will generate, as they are universal with respect to the type of power supply, i.e. single-phase, two-phase or three-phase, and with respect to the grid voltage available.

In other words, a motor unit provided with a driving apparatus 10 according to the invention is suitable for—and does not require adapting for—being supplied by a plurality of alternative supply grids, which are differentiated for predefined grid voltages or type of supply, single-phase, two-phase or three-phase.

In particular, a motor unit provided with a driving apparatus according to the present invention has the isolations of the windings dimensioned irrespective of the power supply conditions that will be available in the installation site to which they are destined.

In practice, with the present invention it will be possible to avoid realising motor units that are differentiated according to the conditions, meaning in terms of voltage and type of single/two/three-phase, the supply grid of the installation site to which it is destined, as the driving apparatus will compensate for these conditions, providing the clamps of the motor windings with a predefined voltage supply regardless of the voltage and type of supply.

This in particular has the advantage of reducing and simplifying the stock levels destined for sale or destined form maintenance, as they can include only a motor unit configuration for each power requested.

In fact, the use of a driving apparatus 10 according to the invention enables greatly simplifying the storage of parts and components for production of motor units, compressors comprising the motor units and machines in which the compressors can be used, as the structure of the motor groups, the compressors and the machines comprising the driving apparatus 10 will not have to satisfy conditions relative to the supply grid to which they will be connected, from which they are independent.

Purely by way of non-exhaustive example, the transformer device 14 of the driving apparatus 10 according to the invention is advantageously configured such as to provide power to the accumulator means 13 at a continuous voltage of about 400V.

The transformer device 14 of the present example is preferably configured so as to be connectable selectively to a plurality of types of grids having a plurality of different supply voltages.

In other words, the transformer device 14 according to the invention is advantageously configured such as to provide power at a continuous voltage, for example, of about 400V, being also configured to be able to absorb power from any supply grid, selected, merely by way of non-exhaustive example, from alternating current grids with frequencies of 50 Hz or 60 Hz:

single-phase grid at 110 V or 120 V or 200 V or 230 V;
two-phase grid at 240V;
three-phase grid at 380 V or 400 V or 460 V.

Note that in the present description, where a specific value for a grid voltage is indicated, it is understood that the grid voltage has a value comprised in a range having a limit of 85% of the specific value and an upper limit of 110% of the specific value and that preferably it has an effective or rated value equal to the specific value.

Structurally the driving apparatus 10 for an electric motor 11, according to the present invention, has a peculiarity in that it comprises:

two buck converters 100, 200 connected in parallel to form an interleaved configuration;

a boost converter 300 connected in series with the buck converters 100, 200;

a control device 24 connected to the converters 100, 200, 300 and configured to operate the latters so as to obtain a preset constant voltage to the ends of the second connection means 16 regardless of the voltage and the electrical supply type provided at the ends of the first connection means 15.

The transformer device 14 of the present invention is advantageously configured for alternatively operating:

a pre-charge mode for charging the accumulator means 13, at least until reaching a predefined minimum threshold voltage, preferably 130V, by activation of the buck converters 100 and 200 in interleaved mode; and in a regime mode in which t are selectively activated he buck converters if the supply of the transformer device 14 is three-phase, or the boost converter 300 if the supply is single-phase or two-phase.

Note that according to the present invention, once the single/two-phase or three-phase supply has been defined, the boost converters 300 remain stably active in the first case—or the buck converters 100, 200 remain active—in the second case.

In other words, the driving apparatus 10, according to the present invention, is structured so that on completion of the pre-charge of the accumulator means 13, if the supply is three-phase only the buck converter 100 and 200 are maintained stably active, in interleaved mode, or, if the supply is single-phase or two-phase, then only the boost converter 300 is maintained stably active.

This has the advantage of having a simple function, stable and always suitable for the type of supply. Differently the traditional driving apparatus described in EP504094 not only has a functioning limited to single-phase supply, but also has a more complex structure, which includes a continuous passage between the BUCK and BOOST modes at each half-wave of the supply current, so as to obtain an intermediate voltage between the work capacity of the BUCK mode and the work capacity of the BOOST mode.

As described, the transformer device 14 is configured so as to supply the accumulator means 13 at a predefined voltage, preferably 400V.

On activating the driving apparatus two situations can arise:
a first, according to which the supply is single/two-phase;
the second, in which the supply is three-phase.

The transformer device is preferably configured so as to switch from the above pre-charging mode to the regime mode following the reaching, at the ends of the accumulator means, of the predefined minimum threshold voltage for which it is observed that a value of 130V enables obtaining a high efficiency of the driving apparatus 10.

In the first above-delineated situation, therefore, the transformer device 14, according to the present invention, when switching from the pre-charging mode to the regime mode deactivates the buck converters 100 and 200 and activates the boost converter 300 so that the voltage at the ends of the accumulator means, brought to at least 130V by the buck converters 100 and 200, is subsequently raised up to the preferred 400V in regime conditions.

In the second situation, on the other hand, in the passage from the pre-charging mode to the regime mode, the buck converters 100 and 200 are kept active, piloted so as to bring the voltage at the ends of the accumulator means to the preferred 400V.

From a structural point of view, the transformer device 14 preferably comprises two electrical input contacts 17a, 17b, electrically connectable to corresponding contacts of the first connection means 15, and two electrical output contacts, 18a and 18b, electrically connectable to corresponding contacts of accumulator means 13.

In a particularly simple and efficient structure the buck converters 100, 200 each comprises:
a first switch member 19, 19' having a first end 19a, 19a' electrically connectable with a first 17a of the electrical input contacts 17a, 17b,
a first diode 20, 20' having the input 20a, 20a' connected to the first switch member 19, 19' with the output 20b, 20b' being connectable to the second of the electrical input contacts 17a, 17b,
an inductor 21, 21' having a first end 21a, 21a' connected to the input 20a, 20a' of the first diode 20, 20'.

To the advantage of the structural simplicity, the boost converter 300 preferably comprises:
a second switch member 22 having a first end 22a connected to the second end 21b, 21b' of the inductors 21, 21' of the buck converter 100, 200 and a second end 22b connected to the output 20b, 20b' of the first diodes 20, 20' of the buck converter 100, 200 and connectable to a first 18a of the output electrical contact 18a, 18b, and a second diode 23 having the output 23b thereof connected to the first end 22a of the second switch member 22 and the input 23a connected electrically to the second 18b of the output electrical contact 18a, 18b.

Note that in the present description, for simplicity of demonstration, reference has been made to specific electronic components, i.e. to diodes, inducers and switch members; however, the importance of the invention should be considered to be extended to all the technical elements which exhibit an equivalent and interchangeable functionality with the specific electrical components described herein.

In practice, the reference to the diode in the present description is meant to indicate the means enabling passage of current from a first electrical contact, which in the present description is indicated as the input, to a second electrical contact, which in the present description is indicated as the output, and to oppose passage from the output towards the input, for example as with a transistor.

Likewise, by "switch" in the present description are meant means able to interrupt or restart passage of electrical current and by inductor is meant an organ provided with a predefined inductance or any organ technically equivalent thereto.

The first connection means 15 are configured to be selectively connectable to a single-phase grid or to a two-phase grid or three-phase grid.

In other words, the connection means 15 are preferably configured so as to be connected alternatively to the connectors of a single-phase or two-phase or three-phase grid, without requiring adaptor devices or modifications to the structure thereof.

In an alternative embodiment of the invention, preferred but not exclusive, the connection means 15 are dedicated to connection to a specific type of grid supply, single-phase or two-phase or three-phase.

In greater detail, the first connection means 15 preferably comprise three diode bridges 24a, 24b, 24c, or equivalent electronic components, reciprocally connected in parallel.

A second of the diode bridges 24a, 24b, 24c is advantageously configured to be connectable to a line of a single-phase grid or to a first line of a two-phase or three-phase grid.

A second of the diode bridges 24a, 24b, 24c is configured to be connectable to the neutral of a single-phase grid or to the second line of a two-phase a three-phase grid.

The third of the diode bridges (24a, 24b, 24c) is preferably configured to be connectable to the third line of a three-phase grid.

The control device 24 is advantageously configured to actuate the switch members 19, 22 according to three default alternative modes so as to provide power to the accumulator means 13 at the pre-set voltage.

A first of these modes is predefined for the case of connection of the first connection means 15 to a single-phase grid; a second of the modes being predefined for the case of connection of the first connection means 15 to a two-phase grid; a third of said modes being predefined for a case of connection of the first connection means (15) to a three-phase grid.

The control device is preferably also connected to an operating organ 25 able to inhibit, when active, or activate, when inactive, the buck converters 100 and 200.

The present invention also advantageously relates to a motor group 100 which comprises an electric motor 11 and has a particularity of comprising a driving apparatus 10, as described in the foregoing, having the inverter 12 connected to the windings of the electric motor 11, for piloting the rotation velocity and the torque supplied by the electric motor 11.

An object of the present invention is also a driving method of a driving apparatus 10 which has a particular peculiarity in that it comprises:

- a pre-charge phase for charging the accumulator means 13, which provides the actuation of the buck converter 100, 200 in interleaved mode, up to reaching a predefined minimum threshold voltage, preferably 130V, at the ends of the accumulator means 13;
- an operation mode selection phase in which a first mode of operation is activated selectively if the transformer device 14 is supplied in single-phase or two-phase, or a second mode of operation, if the transformer device (14) is supplied in three-phase.

The first functioning mode includes the deactivation of the buck converters 100 and 200 and the activation of the boost converter 300, preferably in pulse width modulation and advantageously with a correction of the power factor.

The second mode of operation includes the deactivation of the boost converters 300 and the activation of the buck converters 100 and 200, in interleaved mode preferably in pulse width modulation.

In detail, the activating method of the present invention preferably includes:

- checking whether the transformer device 14 is electrically powered;
- in said pre-charge phase, operating the transformer device 14 in order to charge the accumulator means 13 if the transformer device 14 is electrically powered and the electric voltage at the ends of the accumulator means 13 is lower than a predefined minimum threshold voltage;
- in said modes of operation, driving the transformer device 14 so as to take a power factor corrective action (i.e. PFC) if the transformer device 14 is electrically powered and the electrical voltage at the ends of the accumulator means 13 is not lower than the preset voltage;
- disabling the transformer device 14 if it is not electrically powered.

The step of operating the transformer device 14 in order to load the accumulator means 13 advantageously includes operating the first switch members 19, 19' in such a way as to obtain a predefined modulation of wave amplitude, indicated as PWM in the jargon, which is an acronym of pulse width modulation.

The step of operating the transformer device 14 so as to take a power factor corrective action includes actuating the switch members 19, 19', 22 so as to obtain a power factor corrective action.

The step of disabling the transformer device 14 advantageously includes arranging the switch members 19, 19' and 22 in a switched-off configuration of the current crossing them.

Figure 2:
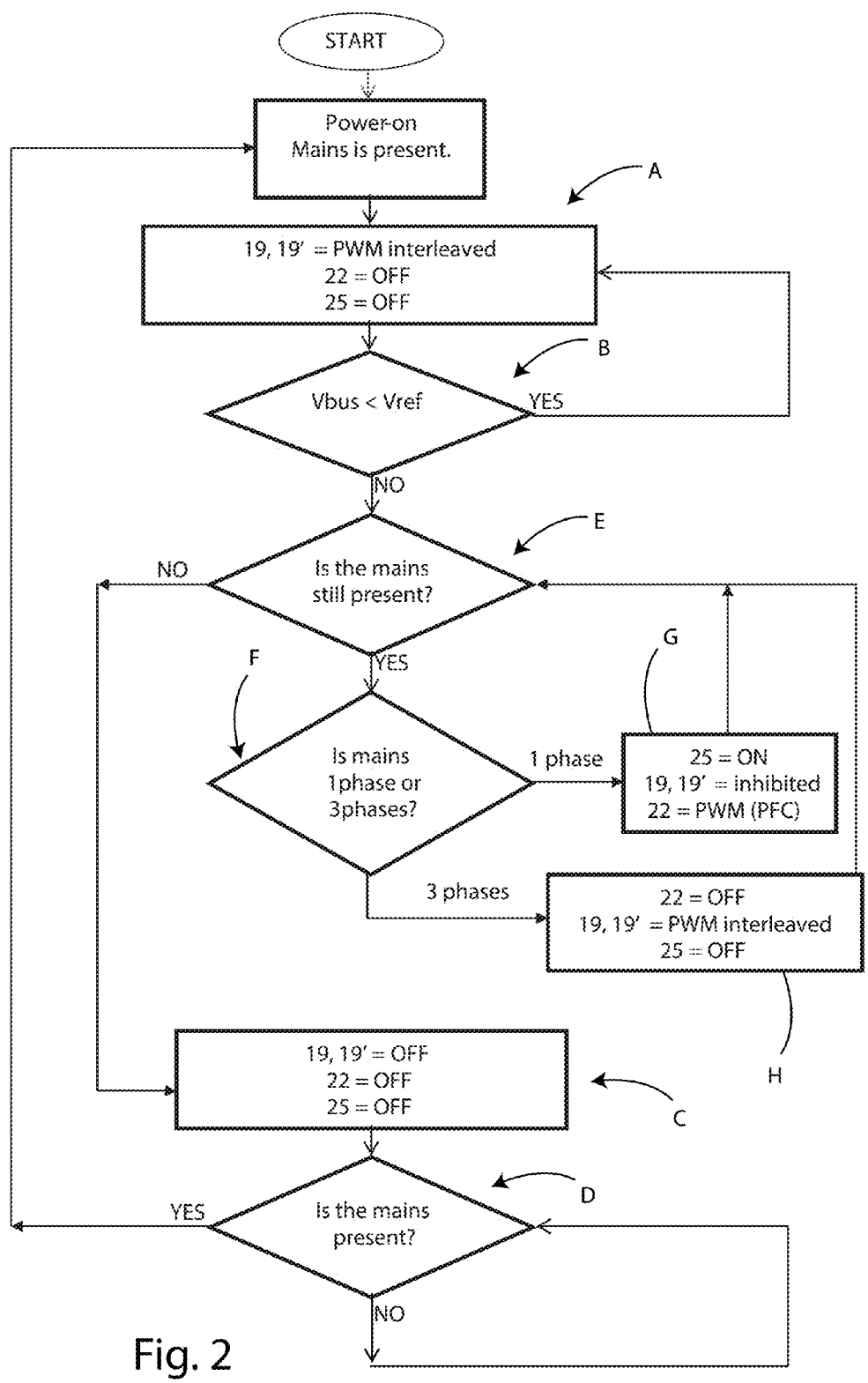
FIG. 2 is a flow diagram of a functioning algorithm of the driving apparatus according to the invention.

With particular reference to FIG. 2, this illustrates a possible implementation of the method according to the present invention.

The method is advantageously actuated by the control device 24.

In particular, in FIG. 2 the above-described components are indicated using the numerical references also used in FIG. 1.

In this possible embodiment of the method according to the present invention, this includes the following operations:

- first operation A, comprising activation of the first switch members 19 and 19' and piloting thereof according to the interleaved mode, deactivation of the operating member 25 and deactivation of the second switch member 22; the first operation being aimed at carrying out the pre-charging of the accumulator means 13;
- a first verification operation B, in which a verification is made of whether the voltage at the ends of the accumulator means 13, indicated in FIG. 2 with reference Vbus, is smaller than the predefined minimum threshold voltage Vref which is preferably 130V; this verification operation sends back to the first operation, if se Vbus<Vref, or starts up a function selection cycle, as described below; in other words this first verification operation B maintains the supply condition of the accumulator means 13 up to completion of the pre-charge, or up until Vbus is not at least equal to Vref;
- a second operation C, which includes disabling the first switch members 19 and 19', the operating organ 25 and the second switch member 22, if there is no supply to the transformer device 14, and sending on to a second verification step D;
- the second verification step D, in which it is verified whether the supply of the transformer device is present; if this is positive, sending on to the first operation A.

The above-described functional selection comprises the following operations:

- a third verification step E, in which it is verified whether the transformer device 14 is powered, and, if so, passing on to a fourth verification step F, while if not sending to the second operation C;
- the fourth verification step F, in which it is verified whether the power supply is single-phase, in which case passing on to a third operation G, or if the supply is three-phase, passing on to a fourth operation H;
- the third operation G, which includes activating the second switch member 22, piloting the boost converter so as to obtain a predefined modulation of the wave amplitude PWM with a correction of the power factor PFC, and activating the operating organ 25 so as to inhibit the functioning of the first switch members 19, 19' and consequently of the buck converters 100 and 200;
- the fourth operation H, which includes disabling the second switch member 22, activating the first switch members 19 and 19' and piloting them in the interleaved mode, and disabling the operating member 25.

The fourth and fifth operation G and H include sending on to the third verification step E.

This implementation of the method of the present invention enables a particularly simple and effective management of the driving apparatus 10.

As has been demonstrated, the present invention attains the set purpose and aims as the structure of the motor unit can be separated from the type of available power supply.

From an operating point of view, the method of the present invention, in the said form of implementation, advantageously comprises:

- a pre-charge cycle of the accumulator means 13, with a verification of the reaching of a minimum pre-charging voltage Vref, constituted by the first operation A and the first verification step B;
- a functioning cycle in a case of single-phase supply, constituted by the third verification step E, the fourth verification step F and the third operation G;

The invention claimed is:

1. Driving apparatus for an electric motor comprising: an inverter coupled to the windings of said electric motor for supplying electrical current to said electric motor an accumulator means to provide a continuous electrical current, connected to said inverter to provide electrical supply thereto; a transformer device comprising a first connecting means for coupling said transformer device to a power grid to absorb power, and a second connection means, for coupling said transformer device to said accumulator means; characterized in that said transformer device further comprises two buck converters connected in parallel to form an interleaved configuration; a boost converter connected in series with respect to said buck converters; a control device connected to said converters and configured to operate said converters to obtain a preset constant voltage at the ends of said second connection means regardless of the voltage and the electrical supply provided at the ends of said first connection means, wherein said transformer device comprises a first and a second electrical input contacts, electrically connected to corresponding contacts of said first connection means, and a first and a second electrical output contact electrically connected to corresponding contacts of said accumulator means; each of said buck converters comprising: a first switch member having a first end electrically connected to a first of said two electrical input contacts, a first diode having an input connected to said first switch member and an output connected to the second of said electrical input contacts, an inductor having a first end connected to said input of said first diode; said boost converter comprising: a second switch member having a first end connected to a second end of said inductor of said buck converter and a second end connected to said output of the first diodes of said buck converter and to said first electrical output contacts and a second diode having its output connected to said first end of said second switch member and an input connected electrically to said second electrical output contact.

2. Driving apparatus according to claim 1, characterized in that said transformer device is configured for alternatively operating: in a pre-charge mode, for charging said accumulator means at least until reaching a predefined minimum threshold voltage, by activation of said buck converter, and in a regime mode in which said buck converters are selectively activated if the electrical supply of said transformer device is three-phase, or said boost converter if the power of said transformer device is single/two-phase respectively.

3. Driving apparatus according to claim 1, characterized in that said first connection means are configured to be connected to a single-phase grid or to a two-phase grid or three-phase grid.

4. Driving apparatus according to claim 1, characterized in that said first connection means comprise three diode bridges connected in parallel, a first of said diode bridges being connected to the line of a single-phase grid or a first line of a two-phase grid, or to a first line of a three-phase grid; a second of said diode bridges being connected to the neutral of a single-phase grid or to the second line of a two-phase grid or to the second line of a three-phase grid; the third of said diode bridges being connected to said third line of a three-phase grid; said control device being configured to actuate said switch members according to three default alternative modes to provide power to said accumulator means at said preset constant voltage; a first of said modes being predefined for the case of connection of said first connection means to a single-phase grid; a second of said modes being predefined for the case of connection of said first connection means to a two-phase grid; a third of said modes being predefined for the case of connection of said first connection means to a three-phase grid.

5. Motor unit comprising: an electric motor; a drive apparatus realized according to claim 1 and having said inverter connected to said windings of said electric motor for controlling rotation velocity and torque supplied by said motor.

6. Method for operating a drive apparatus made according to claim 1, characterized by comprising: a pre-charge phase for charging said accumulator means, which provides the actuation of said buck converter in interleaved mode, up to reaching a predefined minimum threshold voltage at the ends of said accumulator means; an operation mode selection phase in which said buck converter is selectively activated for a first mode of operation, if said transformer device is supplied in single-phase or two-phase, or a second mode of operation, if said transformer device is supplied in three-phase; said first mode of operation including the deactivation of said buck converter and the activation of said boost converter; said second mode of operation including the deactivation of said boost converter and the activation of said buck converter in interleaved mode.

7. Method according to claim 6, comprising the steps of: checking whether said transformer device is electrically powered; in said pre-charge phase, operating said transformer device in order to load said accumulator means if said transformer device is electrically powered and the electric voltage at the ends of said accumulator means is not lower than a predefined minimum threshold voltage; and, driving said transformer device so as to take a power factor corrective action if said transformer device is electrically powered and said electrical voltage at the ends of said accumulator means is not lower than said preset voltage; disabling said transformer device if said transformer device is electrically powered.

8. Method according to claim 7 characterized in that said step of operating said transformer device in order to load said accumulator means provides for operating said first switch members in a width modulation mode.

9. Method according to claim 7, characterized in that said step of operating said transformer device to take a power factor corrective action comprises actuating said switch members to obtain a power factor corrective action.

* * * * *